United States Patent
Do et al.

(10) Patent No.: US 8,643,864 B2
(45) Date of Patent: Feb. 4, 2014

(54) IMAGE FORMING APPARATUS AND ERROR GUIDE OFFERING METHOD THEREOF

(75) Inventors: Tae-hoi Do, Hwaseong-si (KR); Tae-gyun Cho, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 482 days.

(21) Appl. No.: 12/805,803

(22) Filed: Aug. 19, 2010

(65) Prior Publication Data

US 2011/0149330 A1 Jun. 23, 2011

(30) Foreign Application Priority Data

Dec. 22, 2009 (KR) .................. 10-2009-0129124

(51) Int. Cl.
*G06K 15/00* (2006.01)
*G03G 15/00* (2006.01)

(52) U.S. Cl.
USPC .............. 358/1.14; 358/1.12; 399/11; 399/22

(58) Field of Classification Search
None
See application file for complete search history.

(56) References Cited

U.S. PATENT DOCUMENTS

| 5,706,411 | A  | * | 1/1998  | McCormick et al. | ......... 358/1.14 |
| 7,757,131 | B2 | * | 7/2010  | Mochizuki        | ....................... 714/57 |
| 2005/0018235 | A1 | * | 1/2005  | Shikata       | ......................... 358/1.14 |
| 2007/0177184 | A1 | * | 8/2007  | Boston et al. | ................. 358/1.14 |
| 2010/0257414 | A1 | * | 10/2010 | Peters et al. | ..................... 714/57 |

* cited by examiner

*Primary Examiner* — Benny Q Tieu
*Assistant Examiner* — Haris Sabah
(74) *Attorney, Agent, or Firm* — Staas & Halsey LLP

(57) ABSTRACT

An error guide offering method of an image forming apparatus which includes a display unit to display a user interface (UI) offering an error guide to an error, the method including: detecting the error from the image forming apparatus; determining whether the error occurs from a plurality of locations; determining whether error guides to the error occurring from the plurality of locations have a common procedure; displaying a first error guide to a first error; displaying a second error guide to a second error instead of returning to a standby mode upon a completion of the processing of the error according to the first error guide; processing the second error according to the second error guide, the displaying the second error guide including displaying a common procedure in the first and second error guides. With this, an error guide integrating a common procedure to a plurality of errors occurring from the image forming apparatus efficiently processes the error and reduces waste of time.

15 Claims, 4 Drawing Sheets

IMAGE FORMING APPARATUS AND ERROR GUIDE OFFERING METHOD THEREOF

CROSS-REFERENCE TO RELATED APPLICATIONS

This application claims priority from Korean Patent Application No. 10-2009-0129124, filed on Dec. 22, 2009 in the Korean Intellectual Property Office, the disclosure of which is incorporated herein by reference.

BACKGROUND

1. Field

Apparatuses and methods consistent with the exemplary embodiments relate to an image forming apparatus and an error guide offering method thereof, and more particularly, to an image forming apparatus and an error guide offering method thereof which offers an error guide to a plurality of errors occurring from the image forming apparatus.

2. Description of the Related Art

An image forming apparatus forms an image on a document. The image forming apparatus may include a printer, a photocopier, a facsimile, a multi-function device which has at least two functions, etc.

Recently, demand for an image forming apparatus as an office automation device performing not only a document print function but also a scanning function and a faxing function has increased. Accordingly, the image forming apparatus has been developed to provide extended functions with high performance.

As the functions of the image forming apparatus become various, the type of errors which may occur from the image forming apparatus increases and a measure taken by a user for the errors is complicated.

To enable a user to easily take measures for the error, a method of offering an error guide through a user interface (UI) as a text or graphic provided in the image forming apparatus is used.

However, if the error guide is offered through the UI as above, the conventional image forming apparatus provides sequential measures for each of a plurality of errors.

Thus, a user repeats the same error guide to a plurality of errors, causing inefficiency and wasting time unnecessarily.

SUMMARY

Accordingly, one or more exemplary embodiments provide an image forming apparatus and an error guide offering method thereof which offers an error guide integrating a common procedure in errors guides to a plurality of errors occurring from the image forming apparatus, and processes the errors efficiently and reduces waste of time.

The foregoing and/or other aspects may be achieved by providing an error guide offering method of an image forming apparatus which includes a display unit to display a user interface (UI) offering an error guide to an error, the method including: detecting the error from the image forming apparatus; determining whether the error occurs from a plurality of locations; determining whether error guides to the error occurring from the plurality of locations have a common procedure; displaying a first error guide to a first error; displaying a second error guide to a second error instead of returning to a standby mode upon a completion of the processing of the error according to the first error guide; processing the second error according to the second error guide, the displaying the second error guide including displaying a common procedure in the first and second error guides.

The first and second errors which have the common procedure may be selectively processed.

The method may further include displaying a type of the error and a location where the error occurs.

The first error guide and the second error guide may be displayed in the preset order of priority in processing the first and second errors which have the common procedure.

The detecting the error and confirming the completion of the processing of the error may be performed by a sensor within the image forming apparatus.

A next procedure may be displayed if the completion of processing the error is confirmed by the sensor.

Another aspect is achieved by providing an image forming apparatus which provides a user interface (UI) offering an error guide to an error, the image forming apparatus including: a display unit which displays thereon a UI offering a guide to the error; a storage unit which stores therein an error guide to the error; a controller which determines whether the error occurs from a plurality of locations upon a detection of the error, determines whether a common procedure exists in error guides to the errors occurring from the plurality of locations based on the stored error guide, controls the display unit to display thereon a first error guide to a first error, and controls the display unit to display thereon a second error guide to a second error instead of returning to a standby mode upon a completion of processing the first error according to the first error guide, and the controller controlling the display unit to firstly display a common procedure in the first error guide and the second error guide.

The first and second errors which have the common procedure may be selectively processed.

The display unit may display thereon a type of the error and a location where the error occurs.

The display unit may display thereon the first error guide and the second error guide in a preset order of priority in processing the first and second errors which have the common procedure.

The detection of the error and the confirmation of the processing of the error may be performed by a sensor within the image forming apparatus.

The display unit may display a next procedure if the processing of the error is confirmed by the sensor.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
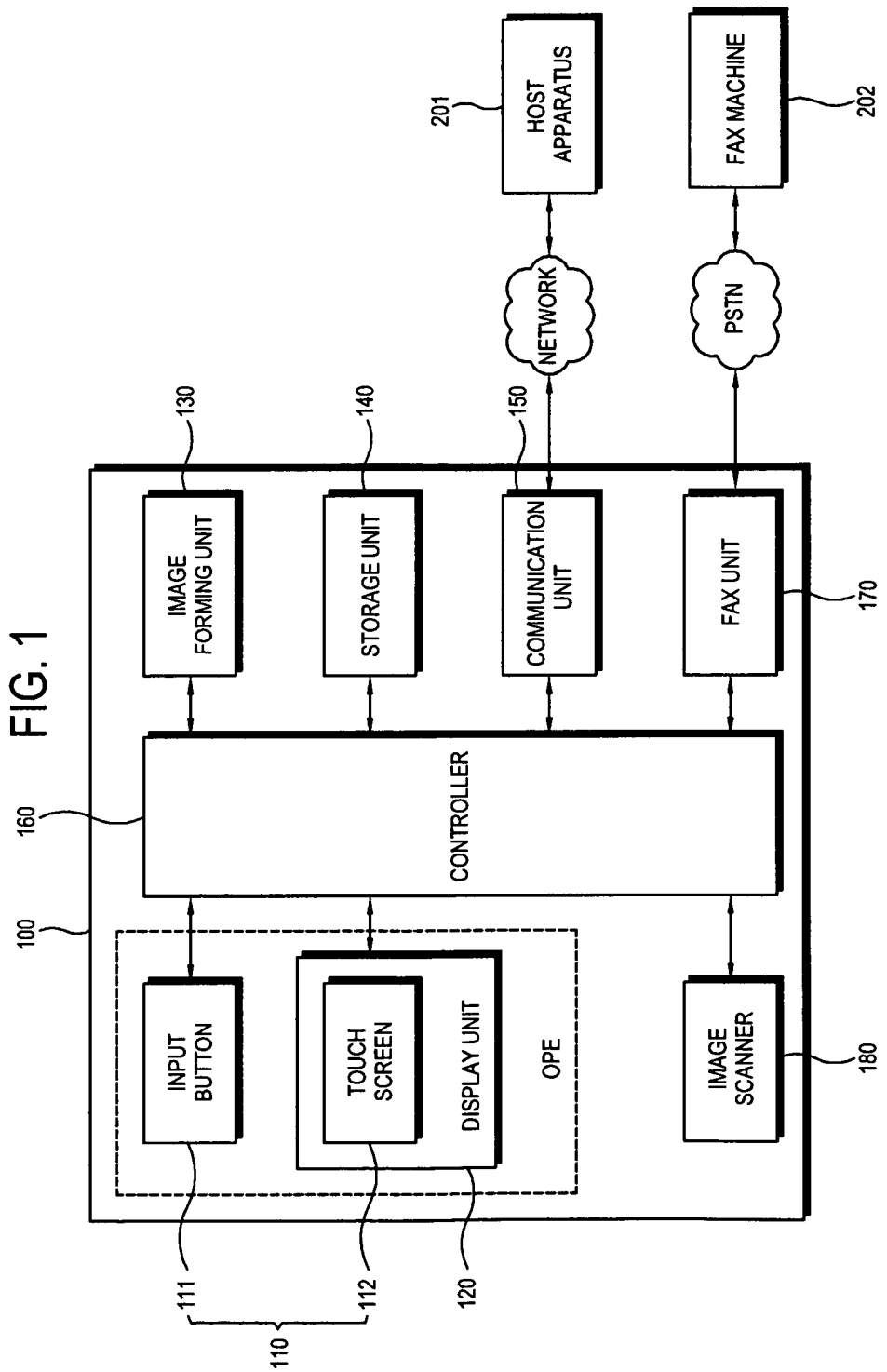
FIG. 1 is a block diagram of an image forming apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an image forming apparatus 100 according to an exemplary embodiment. The image forming apparatus 100 may include a multi-function device having at least two of print, copy, scan and fax functions or a printer.

As shown therein, the image forming apparatus 100 according to the exemplary embodiment includes a user input unit 110, a display unit 120, an image forming unit 130, a storage unit 140, a communication unit 150 and a controller 160. The image forming apparatus 100 may further include a fax unit 170 and an image scanner 180 as in FIG. 1.

The image forming apparatus 100 may further include a sensor which is provided in each element and senses an error. For example, a plurality of sensors may be provided in each of paper feeding paths to detect a jam while a sensor may be provided in a cartridge mounting part to sense a residual amount of a toner. The image forming apparatus 100 may sense an error and confirm the processing of the error through the sensor therein. The sensing result of the sensor is transmitted to the controller 160.

The user input unit 110 receives data or a command from a user.

The user input unit 110 includes an input button 111 (hereinafter, to be also called "hard key" or "key pad") provided in the image forming apparatus 100 or a touch screen 112 (hereinafter, to be also called "touch panel" or "touch pad") which receives a user's command by touch.

The input button 111 includes a number key such as 0, 1, 2, . . . , and 9, a special key such as * and #, a function key corresponding to various functions of the image forming apparatus 100 and a menu key to set the environment of the image forming apparatus 100.

The touch screen 112 may include a graphic user interface (GUI) (hereinafter, to be also called "user interface (UI)") which is generated by an execution of a predetermined application and displayed on the display unit 120 to receive a user's input by touch.

A user may perform a log-in process inputting an ID and a password assigned for each user account through the user input unit 110. The log-in process includes an administrator log-in process in which setting and change of all of the environments of the image forming apparatus 100 is available without an additional access limit.

If a user log-in process or an administrator log-in process is performed, the image forming apparatus 100 identifies and permits a user. According to the embodiment, a user includes an administrator.

The display unit 120 displays thereon a setting and operation status of the image forming apparatus 100. Upon an occurrence of an error, the display unit 120 may display thereon a UI screen offering an error guide. The display unit 120 may display thereon a UI screen offering an error guide to a type of the error and a location of the error.

The display unit 120 may include a liquid crystal display (LCD) and a driver (not shown) to drive the LCD.

In the image forming apparatus 100, the user input unit 110 may include a GUI icon to be selected by a user through a touch screen of the display unit 120. The user input unit 110 and the display unit 120 may be provided as a single configuration rather than separate configurations.

In the image forming apparatus 100, the single configuration of the user input unit 110 and the display unit 120 is also called an operation panel equipment (OPE).

The image forming unit 130 forms an image on at least one sheet of paper based on print data and performs a print operation according to a print command. The print operation includes a print operation for received fax data, a print operation to copy a scanned document, and a print operation for print data received from the outside through a host apparatus or print data stored in an inside (hard disk drive) or outside (USB memory stick) of the image forming apparatus 100.

The storage unit 140 stores therein various print data for a print operation, fax data for a fax transmission, image data scanned by the image scanner 180, data received from an external device 201 including a server or the host apparatus or a PC connected through the communication unit 150, various setting information of the image forming apparatus 100 through the user input unit 110, user certification information set for each user account, usage authorization information, etc. The storage unit 140 may further store therein fax data which are received from an external fax machine 202 through the fax unit 170.

The storage unit 140 of the image forming apparatus 100 further stores therein information on an error guide to an error occurring from the image forming apparatus 100. The stored information on the error guide is displayed on the display unit 120 as a UI such as a text or graphic.

More specifically, the stored information on the error guide may include a plurality of UI information sequentially provided to a user corresponding to the occurred errors. The plurality of UI information may include UI (e.g., open and close front door) which may be offered in common for a plurality of errors.

The storage unit 140 includes an internal storage medium such as an HDD, or an external or portable storage medium such as a USB memory, a memory card (memory stick, CF card, and a MMC), and a memory card slot.

The communication unit 150 performs a data communication with the host apparatus or the external device 201 including a server, and receives print data in a predetermined print language from the outside.

The communication unit 150 may include a wired/wireless network communication module which is connected with the external device such as the host apparatus 201 by a local connection or in a network by a predetermined protocol, or an interface (e.g., USB port) connected to a portable storage medium such as a USB memory or an interface which is connected to the HDD.

The communication unit 150 may perform a scan to host function or a scan to server function to transmit a scan image to the host apparatus or the external device 201 by a predetermined protocol or perform a scan to email function to transmit the scan image to the outside or perform a scan to USB function to store the scan image in a USB memory.

The fax unit 170 may include a fax communication module (e.g., modem) which converts image data generated by the image scanner 180 into a fax signal and transmits the fax signal to an external fax machine 202 (including a multi-function device having a fax function) by using a public switched telephone network (PSTN) or receives a fax signal from the external fax machine 202.

The image scanner 180 scans a target document and generates scan data. The target document may include a document, a photo, a film, etc. The image scanner 180 may include a photo converter such as charge-coupled device (CCD) and contact image sensor (CIS) and an image processor which generates an image from a document by using a signal output from the photo converter. The image scanner 180 may further include a scan motor to drive the photo converter and the image processor, and a guide.

The scan data which are scanned by the image scanner 180 may be changed into a fax signal and transmitted to the external fax machine 202 by the fax unit 170.

The controller 160 controls the image forming apparatus 100 as a whole.

More specifically, upon a detection of an error from the image forming apparatus 100, the controller 160 determines whether the errors are plural, and if so, determines whether there is a common procedure in error guides to a plurality of errors. If the common procedure exists, the controller 160 controls the display unit 120 to display thereon a UI offering the error guide integrating the common procedure.

Figure 2:
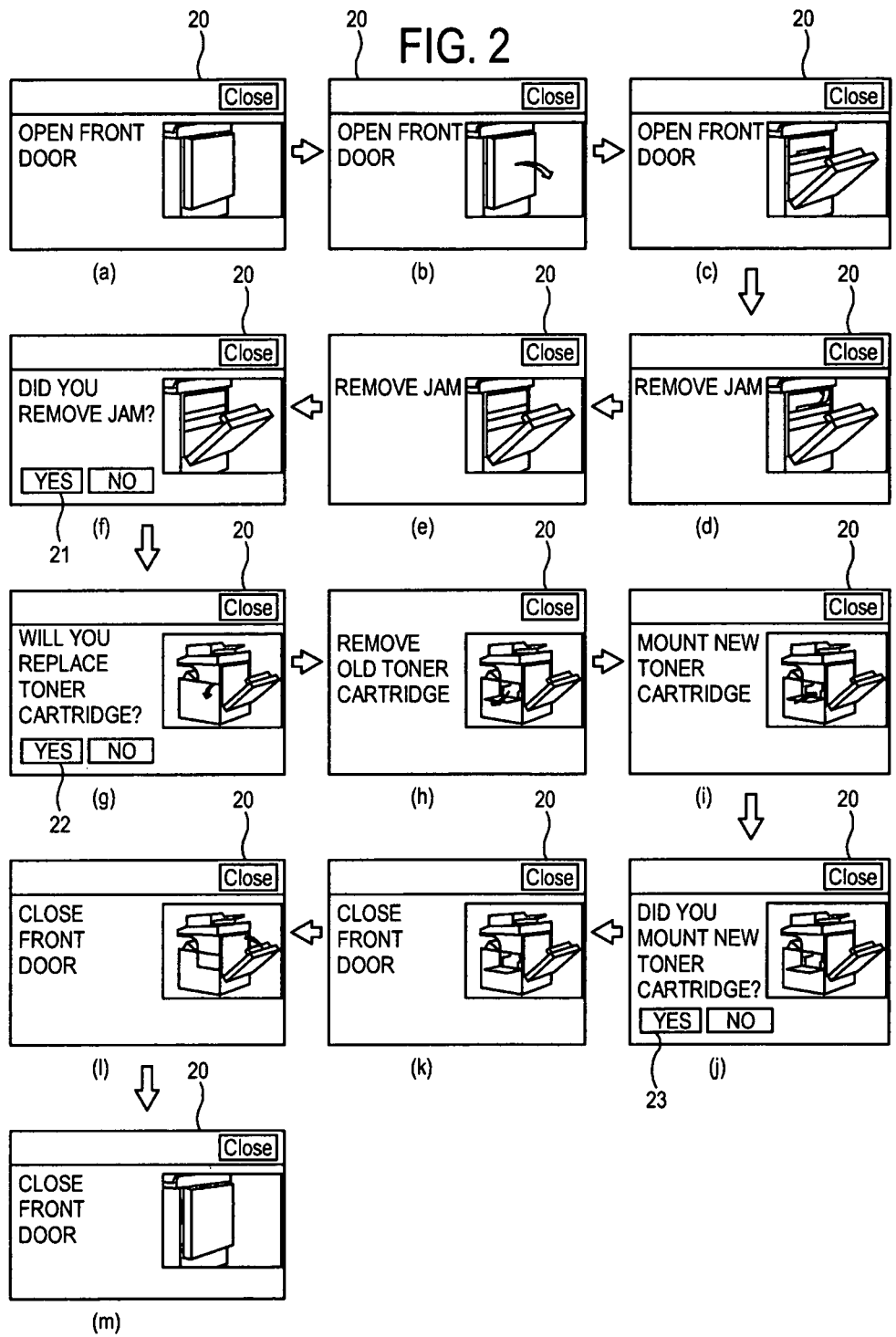
FIGS. 2 and 3 illustrate UI screens which are displayed as an error guide to a plurality of errors according to the exemplary embodiment.
Figure 3:
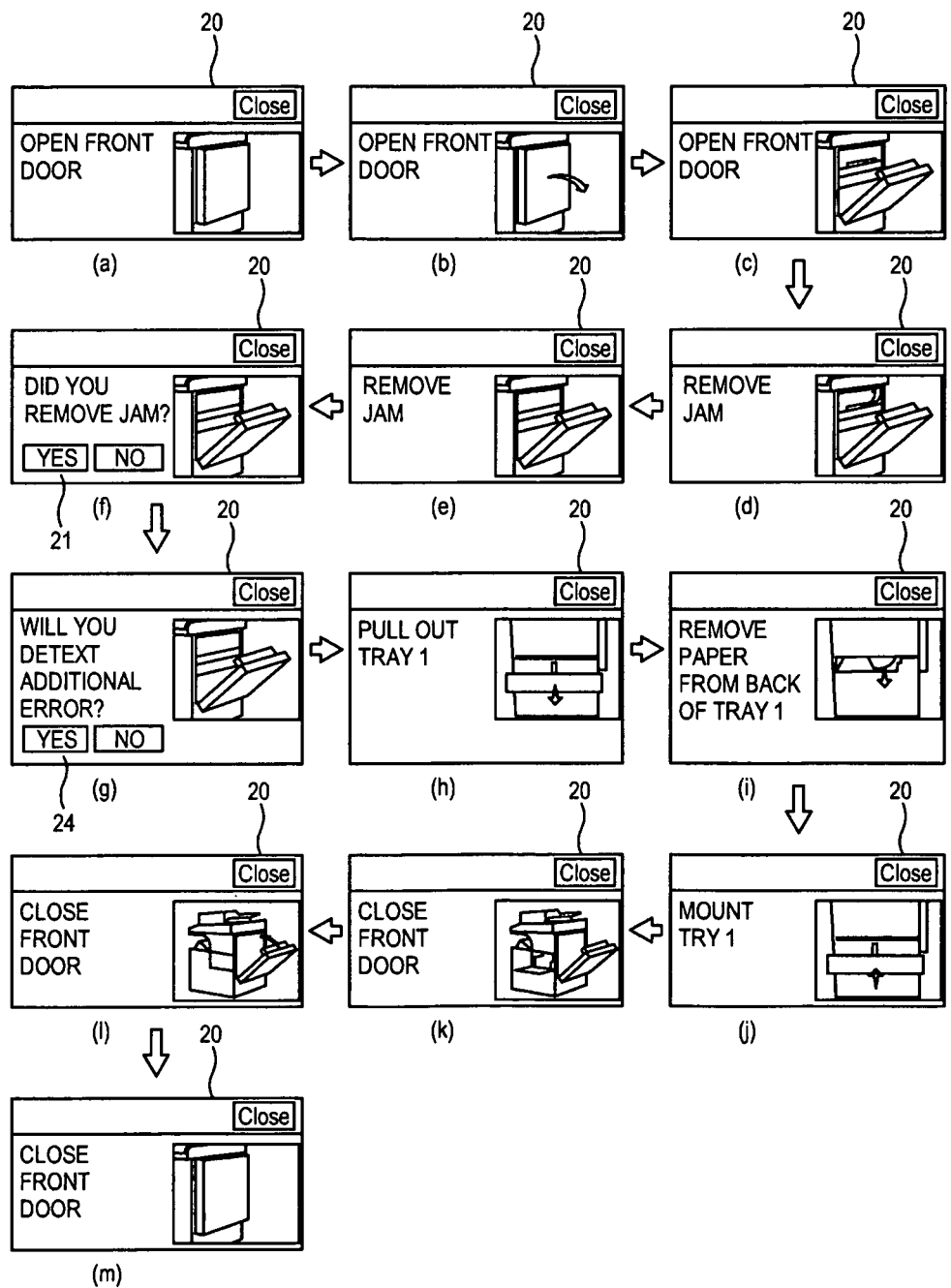

FIGS. 2 and 3 illustrate UI screens 20 which are displayed as an error guide to a plurality of errors according to the exemplary embodiment.

The plurality of errors includes errors which occur from a plurality of locations in the image forming apparatus 100. The plurality of errors includes errors which are plural at the time where the controller 160 detects one of them without limitation to a plurality of errors which occur simultaneously.

That is, as the image forming apparatus 100 provides various functions, it may perform a normal operation even in the case of an error occurring from some functions. The image forming apparatus 100 according to the present invention may provide an error guide one time to a plurality of errors occurring at different periods of time.

For example, the controller 160 may detect an occurrence of a toner empty error while detecting an occurrence of a jam error.

Upon a detection of the jam error, the controller 160 may detect an additional error through a sensor (e.g. toner amount sensor) provided in each element of the image forming apparatus 100.

If the jam error is detected, the controller 160 may control the display unit 120 to display thereon a UI to receive a user's selection on a detection of the additional error, and detect the additional error through the sensor within the image forming apparatus 100 according to a user's selection of the displayed UI.

If it is determined that a plurality of errors have occurred, i.e., that two errors of jam and toner empty have occurred according to the results of the detection on the additional error, the controller 160 identifies whether there is any common procedure in the error guides stored in the storage unit 130 corresponding to the plurality of errors occurred.

For example, the jam and toner empty errors as shown in FIG. 2 may commonly require an "open and close front door (or front cover)" procedure of the image forming apparatus 100. That is, a UI which corresponds to the open and close of front door becomes a common procedure for the plurality of errors in the exemplary embodiment in FIG. 2.

Then, the controller 160 integrates the common procedure as in FIG. 2 and controls the display unit 120 to sequentially offer each error guide to a plurality of errors through a UI except for the common procedure.

For example, let's say the jam error is a first error and a toner empty error is a second error. The controller 160 may control the display unit 120 to display thereon a first error guide to the first error. Upon a completion of processing the error according to the first error guide, the controller 160 controls the display unit 120 to display thereon a second error guide to the second error instead of returning to a standby mode. The controller 160 may control the display unit 120 to firstly display the common procedure of the first and second error guides.

The controller 160 may control the display unit 120 to display thereon the first and second error guides that have the common procedure, in a preset order of priority, in processing the first and second errors.

For example, errors which block the image forming apparatus 100 to perform its function, i.e., toner empty, jam and motor errors may take priority over other errors. In the case of the jam error, it may be divided into jam 0, jam 1 and jam 2 depending on a location of the error and the priority may be set for the errors. Information on the preset priority is stored in the storage unit 130.

More specifically, the controller 160 controls the display unit 120 to sequentially display thereon a "open front door" procedure of the image forming apparatus 100 as a UI screen 20 as in (a) to (c) in FIG. 2.

The controller 160 controls the display unit 120 to display thereon the first error guide, a process of removing the jam, as a UI screen 20 as in (d) and (e) in FIG. 2.

The controller 160 may control the display unit 120 to display thereon a UI to receive a user's confirmation (i.e., feedback) on the completion of the removal of the jam as in (f) in FIG. 2. A user may select a YES button 21 of the UI as in (f) in FIG. 2 and confirm the completion of the removal.

If the image forming apparatus 100 is configured to automatically determine the removal of the jam by the sensor, the process of displaying the confirmation UI as in (f) in FIG. 2 may be omitted. If the sensor senses that the processing of the error is completed, the controller 160 controls the display unit 120 to display thereon a Next procedure.

If the sensor senses that the jam is not removed properly or a user selects a No button in (f) in FIG. 2, the display unit 120 may again display the process of removing the jam in (d) and (e) in FIG. 2.

As above, if the action for the first error (jam error) among the plurality of errors is completed, the controller 160 may control the display unit 120 to display thereon a UI for a user to select whether to proceed with the action for the second error (toner empty error) as in (g) in FIG. 2.

If a user selects the Yes button 22 of the UI in (g) in FIG. 2, the controller 160 controls the display unit 120 to sequentially display thereon a UI screen 20 illustrating a cartridge replacement as the second guide to the toner empty guide as in (h) and (i) in FIG. 2.

If a user selects the No button of the UI in (g) in FIG. 2, the controller 160 may control the display unit 120 to sequentially display thereon the UI screen 20 illustrating a "close front door" procedure of the image forming apparatus 100 in (k) to (m) in FIG. 2 (to be described later).

The controller 160 may control the display unit 120 to display thereon a UI to receive a user's confirmation (i.e., feedback) on the completion of the cartridge replacement as in (j) in FIG. 2. A user may select the Yes button 21 of the UI in (j) in FIG. 2 and confirm the completion of the cartridge replacement.

If the image forming apparatus 100 is configured to automatically determine a removal of an old cartridge and a mounting of a new cartridge by a sensor, the process of displaying the confirmation UI as in (j) in FIG. 2 may be omitted. If the sensor senses that the processing of the error is completed, the controller 160 controls the display unit 120 to display thereon a Next procedure.

If the sensor senses that the cartridge is not replaced properly or if a user selects the No button in (j) in FIG. 2, the display unit 120 may display thereon the cartridge replacement in (h) and (i) in FIG. 2.

Also, the process of displaying the UI for a user to select whether to detect the additional error as in (g) in FIG. 2 may be omitted as the case may be.

As shown in (d) to (j) in FIG. 2, if the first and second error guides are sequentially provided for the first error (jam) and the second error (toner empty), the controller 160 controls the display unit 120 to sequentially display thereon the UI screen 20 illustrating the "close front door" procedure of the image forming apparatus as a common procedure of the plurality of errors, as in (k) to (m) in FIG. 2.

That is, the image forming apparatus 100 controls the display unit to offer the error guide integrating the common procedure in the error guides to the plurality of errors, i.e., open and close front door procedure as in (a) to (c) and (k) to (m) in FIG. 2, and to sequentially offer the error guides to each of the plurality of errors as in (d) to (j) in FIG. 2.

Thus, the common procedure in the error guides to the errors is provided one time without repetition thereof.

Further, a user may selectively process the first and second errors which have the common procedure.

The image forming apparatus 100 may determine whether the errors are plural and offer the error guide integrating the common procedure of the errors guides to the plurality of errors by receiving a user's selection on the detection of the additional error.

For example, while offering the error guide to the jam error, the controller 160 may control the display unit 120 to display thereon a UI to receive a user's selection on the detection of the additional error.

The controller 160 may detect an additional error through the sensor according to a user's selection, i.e. by a user's selection of the Yes button 24 from the UI in (g) in FIG. 3. The additional error may include a jam error which occurs from another area of the paper feeding path, e.g., a tray 1 of the image forming apparatus 100.

Namely, the case where a jam error occurs from a part of the paper feeding path followed by another jam from another path may fall within the exemplary embodiment in FIG. 3.

If it is determined that the errors are plural, i.e., errors occur from two locations according to the detection result on the additional error, the controller 160 determines whether there is a common procedure in the error guide to the plurality of errors.

For example, a plurality of jam errors in FIG. 3 may commonly need the "open and close front door (or front cover)" procedure of the image forming apparatus 100 in the error guide. That is, the UI which corresponds to the "open and close front door" procedure becomes a common procedure for the plurality of errors in the exemplary embodiment in FIG. 3.

Then, the controller 160 integrates the common procedure as in FIG. 3, and controls the display unit 120 to sequentially offer the error guides to the plurality of errors through the UI except for the common procedure.

More specifically, the controller 160 controls the display unit 120 to display the "open front door" procedure of the image forming apparatus 100 as the UI screen 20 as in (a) to (c) in FIG. 3.

The controller 160 controls the display unit 120 to display thereon the process of removing the jam from a first area as the first guide to the first error as the UI screen 20 as in (d) and (e) in FIG. 3.

The controller 160 may control the display unit 120 to display thereon a UI to receive a user's confirmation (i.e., feedback) on the completion of the removal as in (f) in FIG. 3. A user may select the Yes button 21 of the UI in (f) in FIG. 3 and confirm the completion of the removal.

If the image forming apparatus 100 is configured to automatically determine the removal of the jam from the first area by a sensor, the process of displaying the confirmation UI as in (f) in FIG. 3 may be omitted. If the sensor senses that the processing of the error is completed, the controller 160 controls the display unit 120 to display thereon the Next procedure.

If the sensor senses that the jam is not removed properly or if a user selects the No button in (f) in FIG. 3, the display unit 120 may again display thereon the process of removing the jam in (d) and (e) in FIG. 3.

Upon the completion of processing the jam error from the first area as the first error of the plurality of errors, the controller 160 may control the display unit 120 to display thereon a UI for a user to select whether to proceed with the detection of the additional error as in (g) in FIG. 3.

If a user selects the Yes button 22 of the UI in (g) in FIG. 3, the controller 160 detects that another jam error has occurred from a second area, i.e. a tray 2, and controls the display unit 120 to sequentially display thereon the UI screen 20 illustrating the removal of the jam from the second area as the second error guide to the second error as in (h) to (j) in FIG. 3.

If a user selects the No button of the UI in (g) in FIG. 3, the controller 160 may control the display unit 120 to sequentially display thereon the UI screen 20 illustrating the "close front door" procedure of the image forming apparatus 100 in (k) to (m) in FIG. 3 (to be described later).

The controller 160 may control the display unit 120 to display thereon a UI to receive a user's confirmation (i.e., feedback) on the completion of the removal of the jam from the second area as the second error.

As shown in (d) to (j) in FIG. 3, if the error guides to the plurality of jam errors occurring from two areas are sequentially provided, the controller 160 controls the display unit 120 to sequentially display thereon the UI screen 20 illustrating the "close front door" procedure of the image forming apparatus 100 as the common procedure for the plurality of errors as in (k) to (m) in FIG. 3.

That is, the image forming apparatus 100 controls the display unit 120 to offer the error guide integrating the common procedure in the error guides to the plurality of errors, i.e., the "open and close front door" procedure, as in (a) to (c) and (k) to (m) in FIG. 3, and to sequentially offer the error guides to the plurality of errors as in (d) to (j) in FIG. 3.

Accordingly, the common procedure for the jam errors occurring from the plurality of locations may not be repeated unnecessarily.

In the exemplary embodiment in FIGS. 2 and 3, two errors as the plurality of errors occur. However, error guides to the plurality of errors may be applicable to three or more errors.

In the exemplary embodiment in FIGS. 2 and 3, the jam error and the toner empty errors are described as an example of the plurality of errors. However, the embodiments may be applicable to other plural errors occurring from various functions of the image forming apparatus 100 as long as those errors have the common procedure.

Figure 4:
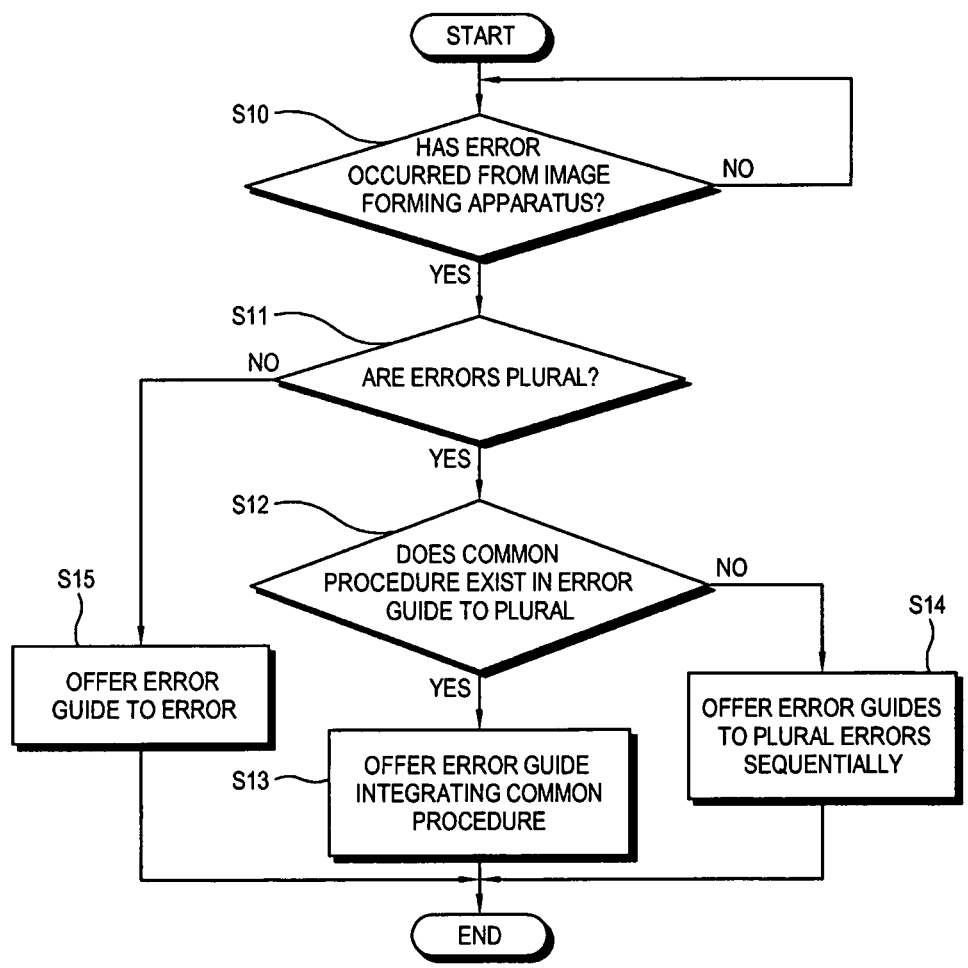
FIG. 4 is a flowchart of an error guide offering method according to the exemplary embodiment.

With the foregoing configuration, a process of offering the error guide of the image forming apparatus 100 will be described with reference to FIG. 4.

As shown therein, the controller 160 may detect the error of the image forming apparatus 100 through the sensor (S10).

If the error is detected at operation S10, the controller 160 determines whether the error(s) is plural (S11). The plurality of errors means errors occurring from the plurality of locations. The controller 160 may detect the additional error through the sensor of the image forming apparatus 100 and receive a user's selection on the detection of the additional error.

If it is determined at operation S11 that the errors are plural, the controller 160 may determine whether there is the common procedure in the error guides to the plurality of errors (S12).

If it is determined at operation S12 that the common procedure exists, the controller 160 offers the error guide integrating the common procedure through the UI (S13). The controller 160 may control the display unit 120 to sequentially offer the error guides to the plurality of errors through the UI, except for the common procedure. If one of the plurality of errors is processed, the controller 160 may display a UI for a user to confirm the completion of the processing of the error.

If it is determined at operation S12 that the common procedure does not exist, the controller 160 controls the display unit 120 to sequentially offer the error guides to the plurality of errors through the UI (S14).

If it is determined at operation S11 that the errors are not plural, i.e., if only a single error occurs, the controller 160 controls the display unit 120 to display thereon the UI illustrating the error guide to the single error (S15).

As described above, an image forming apparatus and an error guide offering method thereof according to the present invention offers an error guide integrating a common procedure to a plurality of errors occurring from the image forming apparatus, and efficiently processes the error and reduces waste of time.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An error guide offering method of an image forming apparatus which comprises a display unit to display a user interface (UI) offering an error guide comprising a plurality of images corresponding to an error, the method comprising:
    detecting the error from the image forming apparatus;
    determining whether the error occurs from a plurality of locations, wherein the occurred errors comprise a first error and a second error;
    determining whether the first error and the second error have a common procedure; and
    displaying an integrated error guide generated based on a first error guide corresponding to the first error and a second error guide corresponding to the second error,
    wherein the displaying the integrated error guide comprises
    displaying the first error guide sequentially, except at least one image corresponding to a procedure for returning to a standby mode; and
    displaying the second error guide sequentially, except the at least one image corresponding to the common procedure and displayed by the displaying the first error guide.

2. The method according to claim 1, wherein the first and second errors which have the common procedure are selectively processed.

3. The method according to claim 1, further comprising displaying a type of the error and a location where the error occurs.

4. The method according to claim 1, further comprising determining the first error and the second error based on a preset order of priority in processing.

5. The method according to claim 1, wherein displaying the integrated error guide further comprises confirming completion of processing of the first error, and
    wherein displaying the second error guide is performed when the completion of the processing of the first error is confirmed.

6. The method according to claim 5, wherein the displaying the integrated error guide further comprises displaying an image corresponding to a next procedure if the completion of the processing of the first error is confirmed by sensor.

7. An image forming apparatus which provides a user interface (UI) offering an error guide comprising a plurality of images corresponding to an error, the image forming apparatus comprising:
    a display unit which displays thereon the error guide offering a guide to the error;
    a storage unit which stores therein the error guide corresponding to the error; and
    a controller which determines whether the errors comprising a first error and a second error are occurred from a plurality of locations upon a detection of the error, determines whether the first error and the second error have a common procedure, based on the stored error guide, controls the display unit to display thereon an integrated error guide generated based on a first error guide corresponding to the first error and a second error guide corresponding to the second error,
    wherein the controller controls the display unit to display the first error guide sequentially, except at least one image corresponding to procedure for returning to a standby mode, and display the second error guide sequentially, except at least one image corresponding to the common procedure and displayed in the first error guide.

8. The image forming apparatus according to claim 7, wherein the first and second errors which have the common procedure are selectively processed.

9. The image forming apparatus according to claim 7, wherein the display unit displays thereon a type of the error and a location where the error occurs.

10. The image forming apparatus according to claim 7, wherein the controller determines the first error and the second error based on a preset order of priority in processing.

11. The image forming apparatus according to claim 7, wherein the controller confirms the completion of the processing of the first error using a sensor, and controls the display unit to display the second error guide when the completion of the processing of the first error is confirmed.

12. The image forming apparatus according to claim 11, wherein the display unit displays a next procedure if the completion of the processing of the first error is confirmed by the sensor.

13. A method of displaying an error guide of an image forming apparatus which includes a display unit, the method comprising:
    detecting if a plurality of errors exist in the image forming apparatus;
    determining whether error guides for the errors occurring from a plurality of locations have a common procedure;
    displaying integrated error guide for each of the plurality of errors having the common procedure; and
    sequentially displaying error guides for each of the plurality of errors not having the common procedure without returning to a standby mode upon a completion of the processing of each error.

14. The method according to claim 13, further comprising displaying a type of the error and a location where the error occurs.

15. The method according to claim 13, wherein the error guides are displayed in a preset order of priority.

* * * * *

UNITED STATES PATENT AND TRADEMARK OFFICE
CERTIFICATE OF CORRECTION

PATENT NO. : 8,643,864 B2
APPLICATION NO. : 12/805803
DATED : February 4, 2014
INVENTOR(S) : Do et al.

Page 1 of 1

It is certified that error appears in the above-identified patent and that said Letters Patent is hereby corrected as shown below:

In the Claims

Column 10, Line 7, in Claim 6, after "wherein" delete "the".

Signed and Sealed this
Twenty-second Day of July, 2014

Michelle K. Lee
*Deputy Director of the United States Patent and Trademark Office*